Oct. 30, 1962

W. J. YOUNG 3,061,069

BELT TYPE CAP SORTING MACHINE

Filed Sept. 21, 1959

INVENTOR
William J. Young

BY Robert S. Sanborn
ATTORNEY

Oct. 30, 1962 W. J. YOUNG 3,061,069
BELT TYPE CAP SORTING MACHINE
Filed Sept. 21, 1959 6 Sheets-Sheet 3

INVENTOR
William J. Young
BY Robert S. Sanborn
ATTORNEY

Oct. 30, 1962 W. J. YOUNG 3,061,069
BELT TYPE CAP SORTING MACHINE
Filed Sept. 21, 1959 6 Sheets-Sheet 4
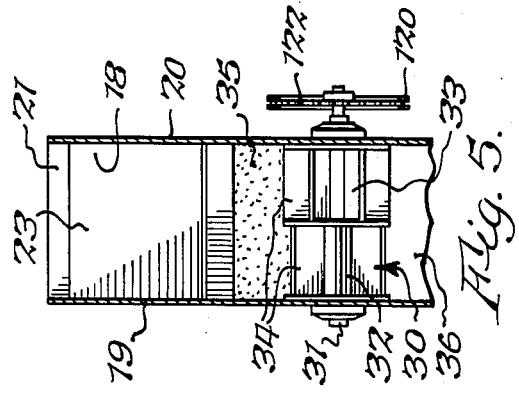
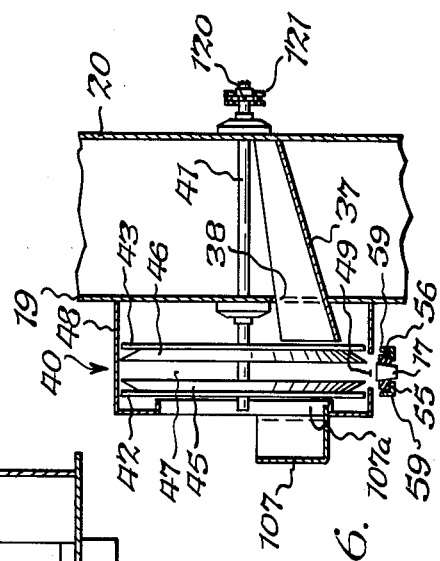
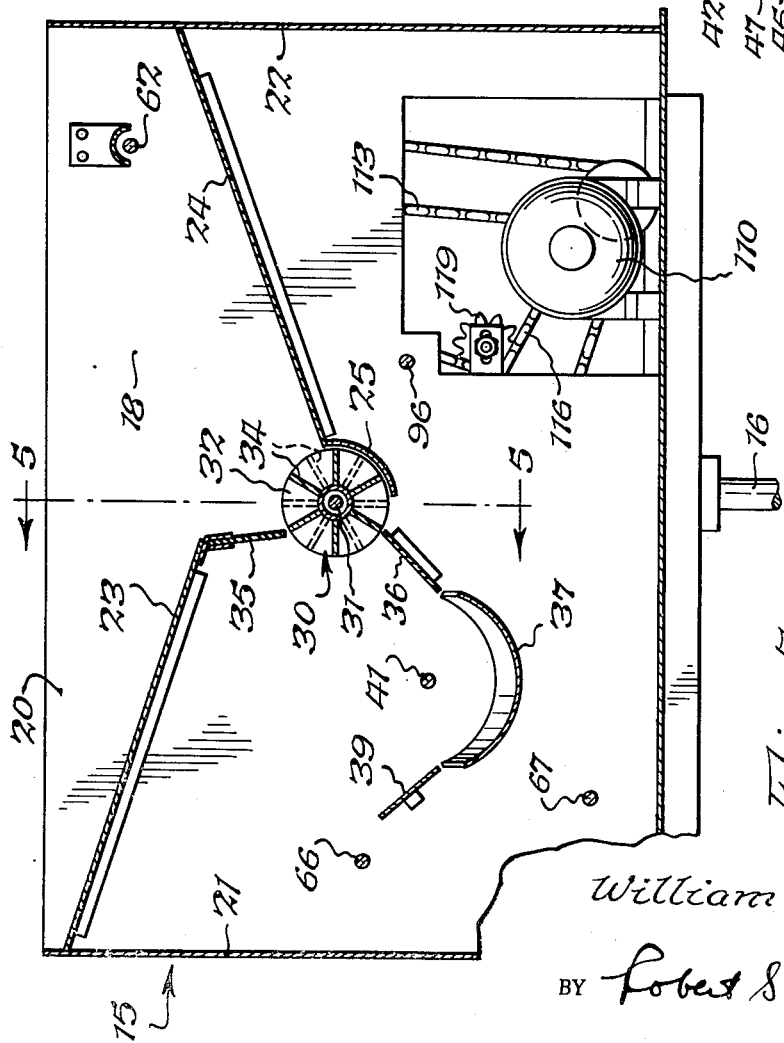
INVENTOR
William J. Young
BY Robert S. Sanborn
ATTORNEY

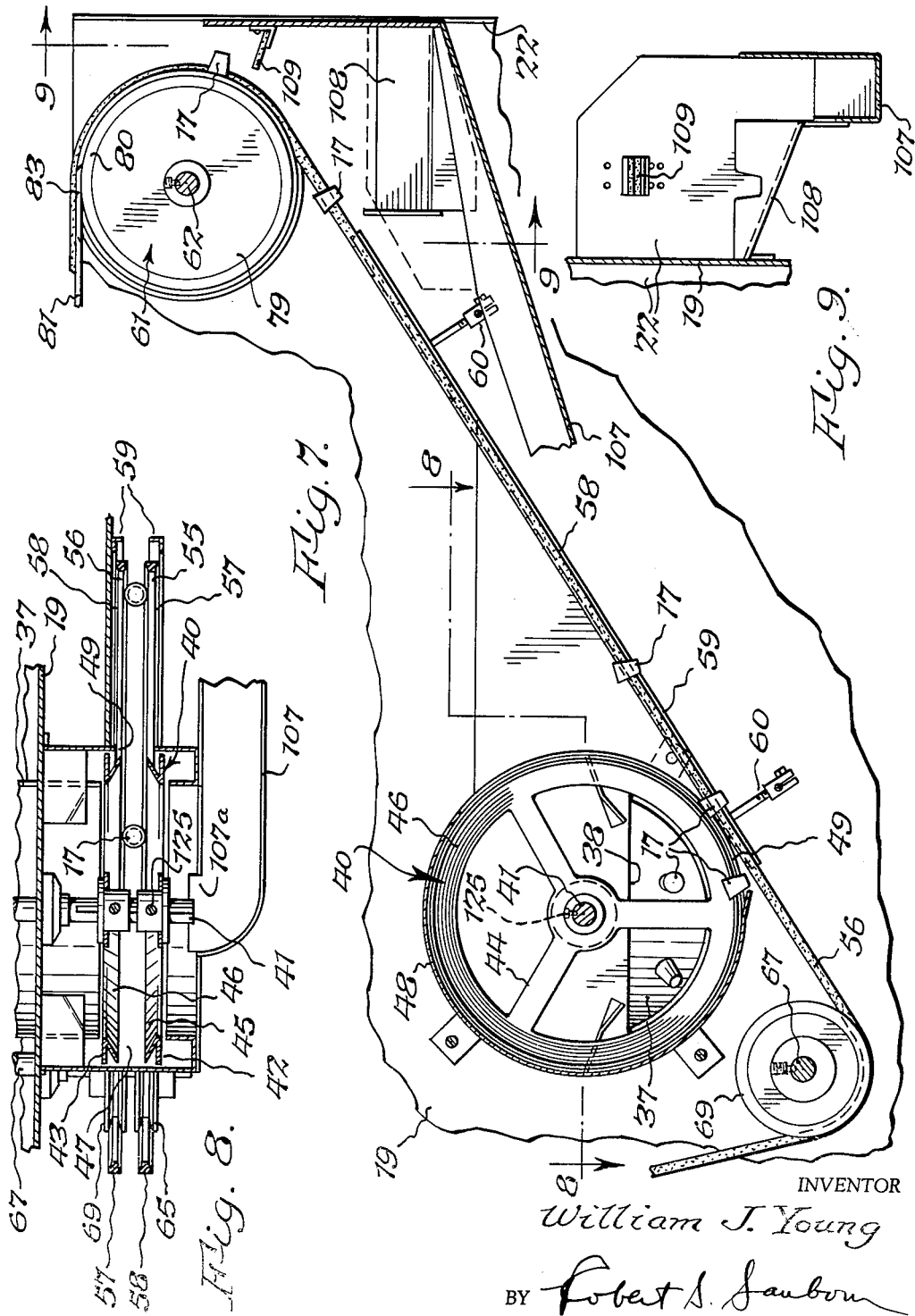

Oct. 30, 1962 W. J. YOUNG 3,061,069
BELT TYPE CAP SORTING MACHINE
Filed Sept. 21, 1959 6 Sheets-Sheet 6

INVENTOR
William J. Young
BY Robert S. Sanborn
ATTORNEY

United States Patent Office 3,061,069
Patented Oct. 30, 1962

3,061,069
BELT TYPE CAP SORTING MACHINE
William J. Young, Buffalo, N.Y., assignor to Consolidated Packaging Machinery Corporation, Buffalo, N.Y., a corporation of New York
Filed Sept. 21, 1959, Ser. No. 841,399
13 Claims. (Cl. 198—33)

This invention relates to ordering apparatus and more particularly to such apparatus of the type which is adapted to arrange a plurality of articles in a uniform and discriminate manner.

Ordering apparatus of the type to which the present invention is directed is particularly suited for arranging a random supply of articles in accordance with a predetermined orientation while advancing them along a feed path. Thus, for example, such apparatus illustratively may be used to position a plurality of container caps or like devices in a uniform row with the openings of all of the caps facing in a downward direction.

Heretofore, machines previously employed for this purpose have exhibited several disadvantages. For example, in many types of such previous machines, the articles being ordered were subjected to frequent tumbling or other agitation, and, particularly in situations where the articles were plated or otherwise provided with an external coating, this often resulted in damage to the coating material or to the articles themselves. Additionally, in machines of the type heretofore employed, the relatively slow rate at which the articles were oriented impaired the use of such machines for many purposes. Furthermore, in previous machines of this type, it frequently was necessary to shut down the machine or otherwise interrupt the ordering operation in situations where an improperly oriented article inadvertently was advanced through the machine or where an excess of oriented articles appeared at the outfeed side of the machine. As a result, the efficiency of machines of this type heretofore was further impaired.

One general object of this invention, therefore, is to provide new and improved apparatus for ordering a plurality of articles which is particularly adaptable for arranging the articles in a uniform and discriminate manner.

More specifically, it is an object of this invention to provide such apparatus which is adapted to perform the ordering operation in a manner such that damage to the articles being ordered is avoided.

Another object of this invention is to provide an ordering apparatus of the character indicated which is adapted to properly orient a plurality of articles from a supply thereof at a maximum rate.

A further object of this invention is to provide an ordering apparatus which is readily adjustable to accommodate articles of various sizes.

Still another object of this invention is to provide an ordering apparatus utilizing comparatively simple mechanical elements, which apparatus is economical to manufacture and thoroughly reliable in operation.

In one illustrative embodiment of this invention, an apparatus for ordering a plurality of articles and feeding them along a path comprises a pair of juxtaposed belts which are spaced apart by a distance sufficient to accommodate the articles therebetween. Infeed means disposed adjacent the belts is adapted to receive a random supply of the articles to be ordered and to orient the articles in a preliminary way while positioning them between the belts. As the belts are advanced, the articles are carried along the path to a receiving means and are automatically released in a manner such that only those articles uniformly aligned in accordance with a selected orientation are discharged therefrom.

In accordance with one feature of this invention, the particular construction of the infeed means, the belts and the receiving means, and the manner in which these parts cooperate with each other, is such that the position of each article is firmly controlled as it is advanced along the path, thereby insuring that even relatively fragile articles are not marred or damaged during the ordering operation. In addition, largely as a result of this firm control of the articles being ordered, the articles can be properly oriented and fed along the path at a maximum rate.

In accordance with another feature of the invention, the articles are discharged from the belts onto the receiving means at a predetermined rate, and any discharged articles exceeding this rate are automatically returned to the infeed means without interruption of the ordering operation.

In accordance with still another feature of the invention, means is provided for automatically returning articles improperly positioned between the belts to the infeed means.

In accordance with a further feature of the invention, the apparatus may be adjusted in a straightforward manner to enable the ordering of articles of widely varying dimensions.

The present invention as well as further objects and features thereof will be understood more clearly and fully from the following detailed description of a preferred embodiment thereof, when read in conjunction with the accompanying drawings in which:

FIGURE 4 is a sectional view taken along the lines 4—4 in FIGURE 3;

FIGURE 5 is a sectional view taken along the lines 5—5 in FIGURE 4;

FIGURE 6 is a sectional view taken generally along the lines 6—6 in FIGURE 1, with certain parts omitted for purposes of clarity;

FIGURE 7 is an enlarged sectional view of a portion of the apparatus, taken generally along the lines 7—7 in FIGURE 3;

FIGURE 8 is a sectional view taken generally along the lines 8—8 in FIGURE 7, together with certain additional parts;

FIGURE 9 is a sectional view taken generally along the lines 9—9 in FIGURE 7, along with the additional parts of FIGURE 8;

Figure 1:
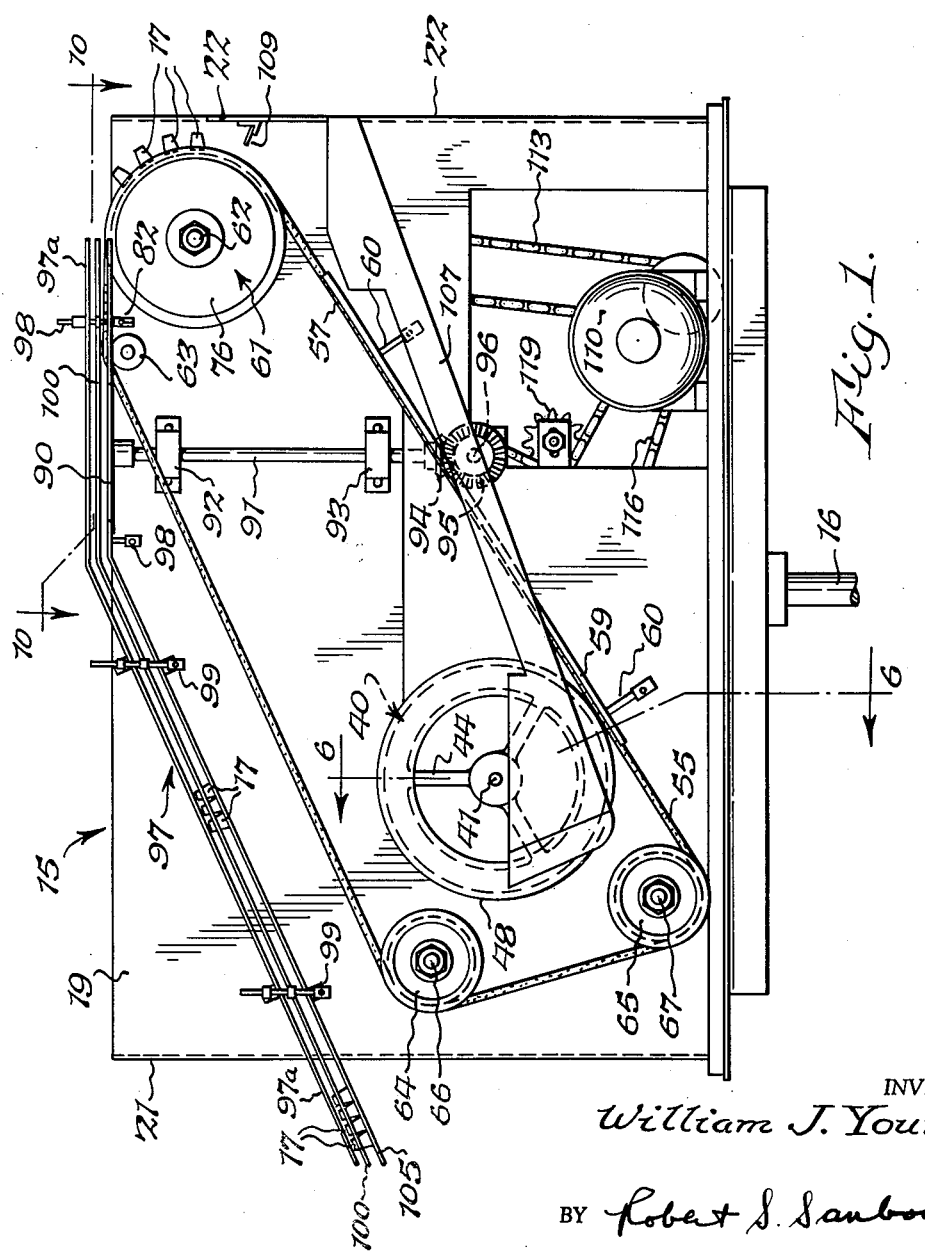
FIGURE 1 is a front elevational view of a preferred ordering apparatus constructed in accordance with the invention.

Referring initially to FIGURES 1 through 4 of the drawings, there is shown an ordering apparatus 15 which is mounted on a pedestal 16 and is adapted to align a plurality of container caps 17 or other articles in a uniform row with the openings of all of the caps facing in a downward direction. Each of the caps 17 is tapered and is substantially in the shape of a truncated cone, the tapered configuration of the caps providing an enlarged portion adjacent their openings. If desired, the caps 17 may be plated or otherwise provided with a decorative coating and illustratively may be of the type frequently employed in the beverage industry. Other illustrative articles that may be oriented in accordance with the ordering apparatus 15 include pyramidical, bullet, or pear-shaped articles, and the apparatus also may be used advantageously to orient headed articles, such as bolts, screws, etc., with the head portions facing in a given direction.

As best shown in FIGURES 4 and 5, the ordering apparatus 15 includes a delivery hopper 18 which is adapted to receive a promiscuous mass of the caps 17 or other articles to be ordered. The hopper 18 is partially formed by two parallel side walls 19 and 20 and by two parallel end walls 21 and 22. Each of these walls is mounted on the pedestal 16 and extends upwardly therefrom. Three hopper bottom walls 23, 24 and 25 are rigidly positioned between the side walls 19 and 20. The bottom walls 23 and 24 are substantially flat and slope downwardly from adjacent opposite, upper corners of the side walls 19 and 20, as viewed in FIGURE 4, in order that the caps 17 may slide freely thereon. The lower horizontal edge of the wall 24 is welded or otherwise secured to the bottom wall 25, and the wall 25, which has an arcuate cross-section, extends downwardly therefrom.

Substantially concentric with the arcuate bottom wall 25 is a metering wheel 30. The wheel 30 is keyed or otherwise affixed to a shaft 31 journaled in the side walls 19 and 20 and includes two sections 32 and 33, each of which is provided with a plurality of radially extending paddle arms 34. The arms 34 on the wheel section 32 are staggered with respect to those on wheel section 33, as best shown in FIGURE 4, and all of the arms 34 are adapted to rotate in a counterclockwise direction, as viewed in this figure, in a manner that will be described in detail hereafter. A deflector 35 of rubber or other relatively flexible material is affixed to the lower horizontal edge of the hopper bottom wall 23, and this deflector hangs downwardly and its lower edge is disposed immediately above the upwardly directed arms 34 of the metering wheel 30.

A transverse plate 36 is fixedly positioned between the side walls 19 and 20 beneath the metering wheel 30. The plate 36 slopes downwardly at an angle that is slightly greater than that of the hopper bottom wall 24, and the lower edge of this plate is disposed adjacent a transverse delivery chute 37. As best shown in FIGURE 6, the chute 37 is secured along its upper edge to the side wall 20, and its opposite edge extends downwardly through an aperture 38 in the side wall 19. A deflector plate 39 (FIGURE 4) is disposed on the side of the delivery chute 37 opposite that of the plate 36 and is suitably held in position between the side walls 19 and 20.

Rotatably disposed adjacent the aperture 38 on the side of the wall 19 opposite that of the wall 20 is an infeed wheel 40. The wheel 40 is mounted on a transverse shaft 41 journaled in the walls 19 and 20 and includes two annular members 42 and 43 which are vertically aligned in spaced relationship with each other and are each connected to the shaft 41 by spokes 44 (FIGURE 7). Rigidly affixed to the members 42 and 43, respectively, are two annular flanges 45 and 46 of substantially conical configuration. The base portions of the flanges 45 and 46 face each other and are spaced apart by a distance that is slightly greater than the largest diameter of the container caps 17 to thereby form an infeed opening 47. The opposite portions of the flanges 45 and 46 abut the respective inner surfaces of the annular members 42 and 43. As best shown in FIGURES 6 and 8, the dimensions of the wheel 40 and the position of the shaft 41 are such that the outer edge of the delivery chute 37 is disposed immediately adjacent the lower portion of the inner cylindrical surface of the annular member 43. The infeed wheel 40 additionally is provided with a substantially cylindrical guard 48 which is mounted in fixed relationship with the side wall 19 and includes an opening 49 along the lower cylindrical surface thereof.

Positioned immediately beneath the infeed wheel 40 are the lower reaches 55 and 56 of a pair of spaced, juxtaposed V-belts 57 and 58. The spacing between the reaches 55 and 56 is slightly less than the largest diameter of the container caps 17, and each of these reaches is supported by an angular guide rail 59 which is maintained in rigid but adjustable relationship with the side wall 19 by brackets 60 (FIGURE 1). The reaches 55 and 56 of the belts 57 and 58 extend upwardly from the infeed wheel 40 in a direction transverse to that of the wheel shaft 41 and at an angle with respect to the horizontal, and the belts are trained around a drive wheel 61 which is mounted on a shaft 62 journaled in the side walls 19 and 20 adjacent the upper right corners of these side walls, as viewed in FIGURE 1. The belts 57 and 58 then pass over an idler roller 63 adjacent the drive wheel 61, and the upper reaches of these belts extend downwardly and are substantially parallel to the lower reaches 55 and 56. The belt 57 is then trained around two idler sheaves 64 and 65 which are respectively mounted on shafts 66 and 67 journaled in the side walls 19 and 20 adjacent the lower left portions of these side walls, as viewed in FIGURE 1, while the belt 58 passes over two idler sheaves 68 and 69 similarly mounted on the shafts 66 and 67. The belts 57 and 58 then return to the guide rails 59 beneath the infeed wheel 40.

Figure 12:
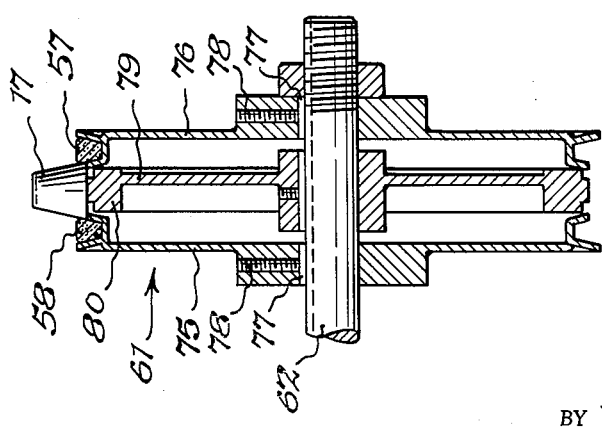
FIGURE 12 is an enlarged sectional view of a portion of the apparatus, taken along the lines 12—12 in FIGURE 11.

As best shown in FIGURE 12, the belt drive wheel 61 includes two sheave portions 75 and 76 which accommodate the belts 57 and 58, respectively, and are spaced apart on the shaft 62. The portions 75 and 76 are maintained in fixed but adjustable relationship on the shaft 62 by means of keys 77 and set screws 78 (FIGURE 12). The drive wheel 61 also includes a pusher wheel 79 which is disposed between the sheave portions 75 and 76 on the shaft 62 and is likewise adjustably keyed thereto. A circular flange 80 is integrally formed on the cylindrical surface of the pusher wheel 79, and the radius of the outer surface of this flange is slightly less than that of the outer surfaces of the portions of the belts 57 and 58 disposed around the sheave portions 75 and 76.

Figure 10:
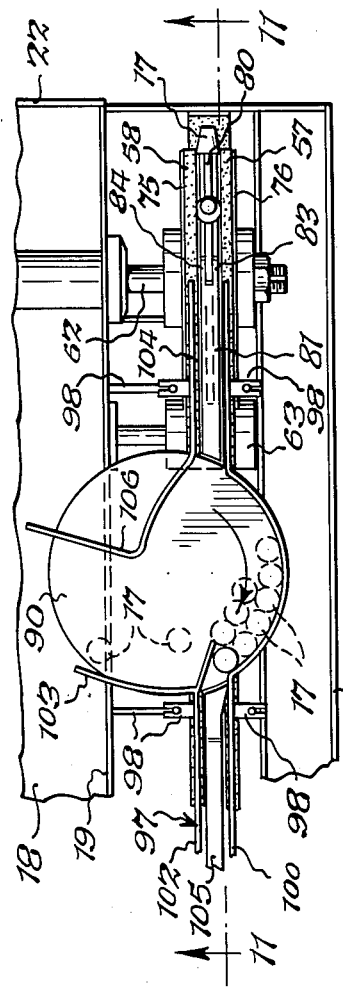
FIGURE 10 is an enlarged plan view of a portion of the apparatus, taken generally along the lines 10—10 in FIGURE 1.
Figure 11:
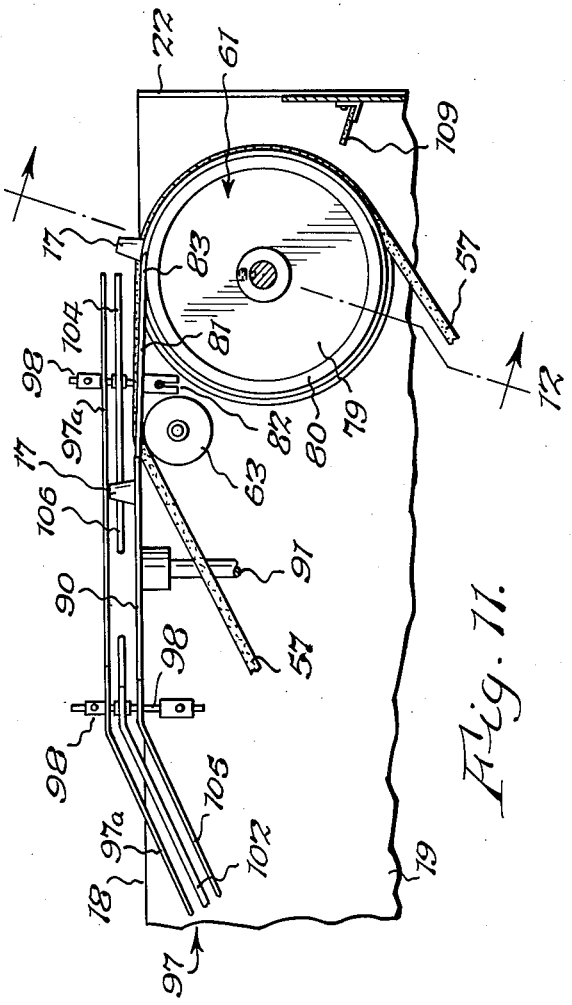
FIGURE 11 is a sectional view taken along the lines 11—11 in FIGURE 10.

Rigidly positioned between the drive wheel 61 and the idler roller 63 is a horizontal plate 81 (FIGURES 10 and 11). The plate 81 is disposed between and slightly beneath the adjacent portions of the belts 57 and 58 and is held in spaced, adjustable relationship with the side wall 19 by a bracket 82. The end of plate 81 adjacent the drive wheel 61 is bifurcated to form two extensions 83 and 84 which rest on the cylindrical surface of the pusher wheel 79 on opposite sides of the flange 80.

The opposite end of the plate 81 is arcuately shaped and abuts a horizontally disposed disc 90, a portion of which is positioned above the hopper 18. The disc 90 is adapted to rotate in a clockwise direction, as viewed in FIGURE 10, and is mounted on a vertically disposed shaft 91 (FIGURE 1) which is held in position adjacent the side wall 19 by two pillow blocks 92 and 93. The lower end of the shaft 91 is keyed or otherwise rigidly affixed to a bevel gear 94 in mating engagement with a bevel gear 95. The gear 95 is mounted on a horizontal shaft 96 journaled in the side walls 19 and 20 and is adapted to rotate in a counterclockwise direction, as viewed in FIGURE 1, in a manner to be described in detail hereafter.

An elongated guideway 97 is positioned on the side of the disc 90 opposite that of the bifurcated plate 81 in substantial longitudinal alignment therewith, as viewed in FIGURE 10. The guideway 97 is provided with a cover 97a (FIGURE 3) which also serves as a cover for a portion of the disc 90 and the plate 81 and is spaced above these parts by a distance that is slightly greater than the axial dimension of the container caps 17. The portions of the guideway 97 and the cover 97a adjacent the disc 90 are disposed in horizontal planes and are held in fixed relationship with the side wall 19 by an adjustable bracket 98. The remaining portions of the guideway 97 and the cover 97a are inclined downwardly immediately above the upper reaches of the belts 57 and 58, as viewed in FIGURE 1, and are held in position by adjustable brackets 99 mounted on the side wall 19. Suitable article receiving means (not shown), such as a storage bin, conveyor belt, etc., is disposed adjacent the lower ends of the guideway 97 and the cover 97a.

A rod 100 is positioned adjacent the outer longitudinal side of the guideway 97 and is held in position by the brackets 98 and 99, while a guide rod 102 is similarly disposed along the inner longitudinal side of the guideway. The right portion of the outer guide rod 100, as viewed in FIGURE 10, extends beyond the guideway 97 and is disposed around a portion of the circumference of the disc 90. The extreme right end of this guide rod is positioned along the outer longitudinal side of the plate 81. The right end of the inner guide rod 102 extends a short distance beyond the guideway 97 and is disposed immediately above the disc 90. An extension 103 meets the guide rod 102 at right angles adjacent the disc 90 and extends rearwardly over the hopper 18. A guide rod 104 is positioned along the inner longitudinal side of the plate 81, and this guide rod extends beyond the left edge of the plate 81. The guide rod 104 is bent slightly adjacent this edge of the plate 81 so that it extends over the disc 90 toward the center portion thereof. The portion of the guide rod 104 extending over the disc 90 includes a right angle bend 106 thereon, and this guide rod portion is disposed rearwardly over the hopper 18. A bottom slide plate 105 supports the caps 17 in the guideway 97 as they are delivered from the rotating disc 90.

A gravity return chute 107 (FIGURE 1) is positioned on the side of the lower reaches 55 and 56 of the belts 57 and 58 opposite that adjacent the side wall 19. The lower, left hand portion of this chute, as viewed in FIGURE 1, is disposed adjacent the infeed wheel 40 and is welded or otherwise rigidly affixed to the guard 48 (FIGURE 6). For purposes that will become more fully apparent hereafter, the portion of the guard 48 between the chute 107 and the wheel 40 is provided with an opening 107a of a configuration sufficient to enable the container caps 17 to pass therethrough. As best shown in FIGURES 7 and 9, the opposite, upper portion of the return chute 107 is secured to the end wall 22. A transverse chute 108 is positioned on the side wall 19 beneath the drive wheel 61, and the chute 108 slopes outwardly from the wall 19. The outer edge of the chute 108 is suitably affixed to the adjacent portion of the return chute 107.

A deflector 109 of rubber or other relatively flexible material is mounted on the end wall 22 above the chute 108 in juxtaposition with the portions of the belts 57 and 58 on the drive wheel 61. For purposes that will become more fully apparent hereafter, the edge of the deflector 109 adjacent the belts 57 and 58 is spaced therefrom by a distance that is slightly greater than the protruding portions of the container caps 17 between the belts.

Figure 2:
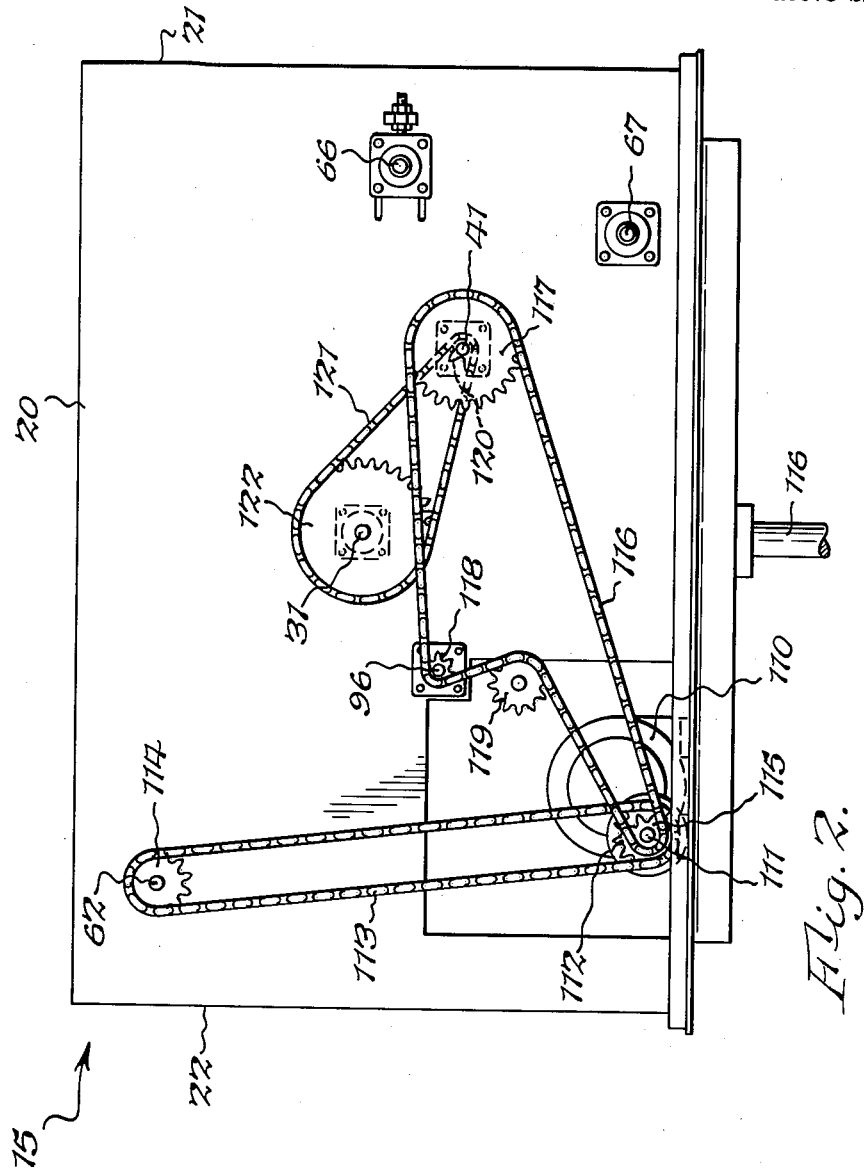
FIG. 2 is a rear elevational view of the ordering apparatus, with certain parts removed for purposes of clarity.
Figure 3:
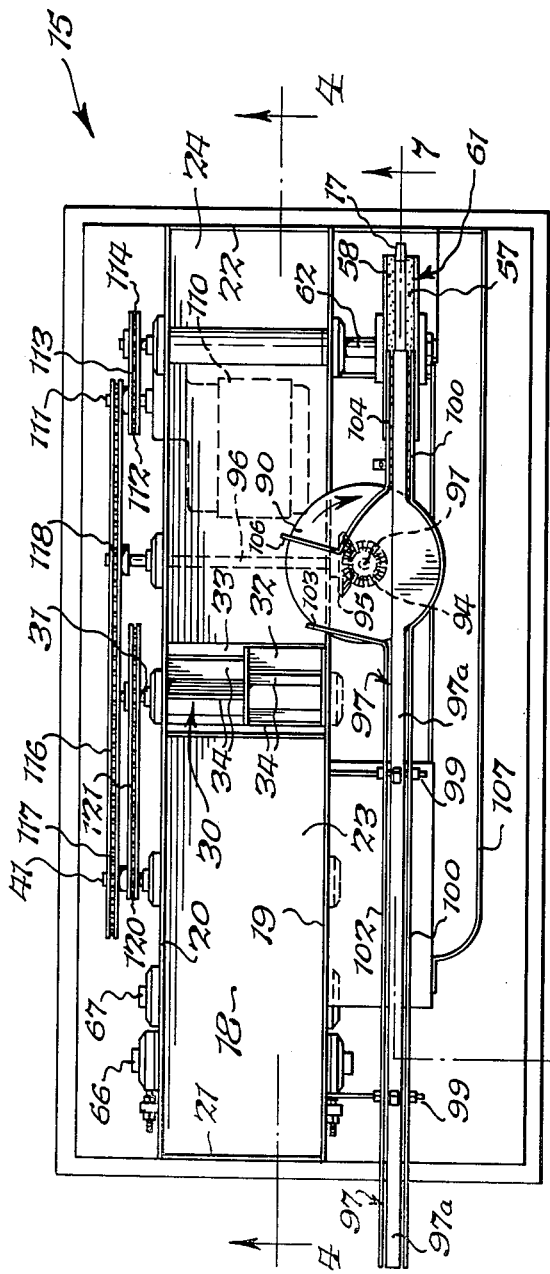
FIGURE 3 is a top plan view of the apparatus.

The ordering apparatus 15 is adapted to be driven by an electric motor 110 (FIGURES 1 and 2) which is mounted on the pedestal 16 between the side walls 19 and 20 and is adapted to rotate in a counterclockwise direction, as viewed in FIGURE 2. The shaft of the motor 110 is suitably geared to a transverse drive shaft 111 journaled in the side walls 19 and 20. A sprocket 112 is keyed or otherwise affixed to the shaft 111 and accommodates an endless chain 113 which is adapted to rotate a sprocket 114 secured to the belt drive wheel shaft 62.

Also mounted on the drive shaft 111 is a sprocket 115 which accommodates an endless chain 116. The chain 116 is disposed along a path from the sprocket 115 to a sprocket 117 on the infeed wheel shaft 41. The chain 116 then passes over a sprocket 118 on the disc shaft 96, around an idler sprocket 119 and back to the sprocket 115. Rigidly affixed to the infeed wheel shaft 41 is a sprocket 120. The sprocket 120 accommodates an endless chain 121 which is trained around a sprocket 122 on the metering wheel shaft 31.

Upon energization of the motor 110, the drive shaft 111 rotates in a clockwise direction, as viewed in FIGURE 2, to similarly rotate the chain 113 and the sprocket 114. The drive wheel shaft 62 is thereby rotated in a clockwise direction, as viewed in FIGURE 2, or in a counterclockwise direction, as viewed in FIGURES 1, 7 and 11, and each of the V-belts 57 and 58 moves along the path outlined heretofore and is driven at a uniform speed by the drive wheel 61.

Simultaneously, the sprocket 115 on the shaft 111 is rotated clockwise, as viewed in FIGURE 2, along with the chain 116, the sprocket 117 and the infeed wheel shaft 41, to thereby drive the infeed wheel 40. The diameter of the sprocket 117 is somewhat larger than that of the sprockets 112 and 115 on the shaft 111 and the sprocket 114 on the shaft 62 with the result that the infeed wheel 40 rotates at a periphery speed less than the speed of the belts 57 and 58. As viewed in FIGURES 1 and 7, the infeed wheel 40 rotates in a counterclockwise direction.

As the chain 116 passes over the sprocket 118 on the disc shaft 96, this shaft is rotated in a counterclockwise direction, as viewed in FIGURE 1, to similarly rotate the bevel gear 95. The rotation of the gear 95 is transmitted by the bevel gear 94 and the shaft 91 to the disc 90, thereby rotating this disc in a clockwise direction, as viewed in FIGURES 3 and 10.

As the infeed wheel shaft 41 rotates, the sprocket 120 thereon (FIGURE 2) drives the chain 121, the sprocket 122 and the metering wheel shaft 31, to thereby rotate the metering wheel 30 in a counterclockwise direction, as viewed in FIGURE 4. The container caps 17 or other articles to be ordered flow by gravity along the bottom walls 23 and 24 of the hopper 18 and between the adjacent paddle arms 34 on each section 32 and 33 of the metering wheel 30. As the wheel rotates, the caps 17 between the adjacent arms 34 on each wheel section are alternately fed down the transverse plate 36 to the delivery chute 37 at a uniform rate, thereby providing and extremely effective metering of the caps that are fed to the chute 37 during each revolution of the wheel 30.

The caps 17 on the delivery chute 37 are in a jumbled or disassociated condition. As these caps flow outwardly along the chute 37 and reach the infeed wheel 40, they drop into the opening 47 and strike the inner surfaces of the rotating flanges 45 and 46. The inner surfaces of the flanges 45 and 46, as indicated heretofore, are of conical configuration, and the spacing therebetween is slightly greater than the largest diameter of each cap but is less than the longitudinal cap dimension. As a result, as the caps 17 drop from the opening 47, they are oriented with their longitudinal axes disposed in a single vertical plane which is substantially perpendicular to the infeed wheel shaft 41 and is parallel to the lower reaches 55 and 56 of the belts 57 and 58. The thus oriented caps fall onto the lower reaches of the belts. As indicated above, the spacing between the belts is slightly smaller than the largest diameter of each cap but is greater than the diameter of the caps at the narrow portions thereof. As the enlarged portions of the caps strike the lower reaches 55 and 56, each cap is deposited between these lower reaches with its enlarged portion uppermost.

As a result of the frictional engagement between the caps 17 and the belts 57 and 58, each cap is carried upwardly, as viewed in FIGURES 1 and 7, to the drive wheel 61. As the caps 17 approach the wheel 61, the flange 80 (FIGURES 10 and 12) on the pusher wheel 79 engages the uppermost portion of each cap and pushes the caps outwardly a short distance in a manner such that all of the caps are uniformly positioned between the belts 57 and 58 and are equidistant from the drive wheel shaft 62. As each cap is pushed outwardly, the tension in the belts 57 and 58, which as they pass around the wheel 61 are prevented from spreading apart by the sheave portions 75 and 76, is such that the caps are firmly grasped by the belts and are rigidly held in position therebetween.

As each of the container caps 17 passes around the drive wheel 61, its orientation is reversed. That is, the caps 17 approaching the wheel 61 are disposed with their enlarged portions uppermost, while the caps leaving the wheel 61 have their enlarged, or open portions, facing in a downward direction. The caps 17 leaving the wheel 61 are advanced along the bifurcated plate 81 by the belts 57 and 58 until they reach the idler roller 63. As the belts 57 and 58 pass over the roller 63 and no longer are prevented from spreading apart, they begin to slope downwardly while the plate 81 maintains the path of the caps 17 thereon substantially horizontal. These caps thereby cause the belts to spread slightly and release the caps 17 therebetween.

The caps 17 released by the belts 57 and 58 are deposited on the rotating disc 90. As a result of the clockwise rotation of this disc, as viewed in FIGURES 3 and 10, each of the caps 17 is forced outwardly toward the portion of the guide rod 100 which is disposed along the circumference of the disc 90. The caps 17 move along this portion of the guide rod 100 until they strike the right hand portion of the guide rod 102 and are deflected onto the inclined guideway 97. The position of the caps 17 on the disc 90 is shown by dotted lines in FIGURE 10. The oriented caps 17 then slide by gravity down the guideway 97 to the receiving means (not shown) at the lowermost portion of this guideway.

In a similar manner, the container caps 17 in the hopper 18 are continuously oriented while being fed along the path from the metering wheel 30, the infeed wheel 40, the belts 57 and 58, and the disc 90 to the guideway 97. As indicated heretofore, the hopper bottom walls 23 and 24 (FIGURE 4), along with the transverse plate 36 and the delivery chute 37, are inclined to enable the caps thereon to be fed by gravity to the metering wheel 30 and the infeed wheel 40. The slope of these inclined parts preferably is just sufficient to provide this gravity feed without causing any substantial tumbling or interaction between the caps. If desired, the bottom walls 23 and 24, the plates 36 and 39 and the chute 37 may be coated with rubber sheeting (not shown) or like material to further protect the caps thereon. During a major portion of the ordering and feeding operation, the container caps 17 are firmly grasped by the belts 57 and 58. As a result, flaking or other injury to the caps is avoided.

Should any of the caps 17 be deposited by the infeed wheel 40 between the belts 57 and 58 in a telescoped or nested condition, the outer nested cap is automatically returned to the wheel 40 by means of the deflector 109, the transverse chute 108 and the return chute 107. As a pair of nested caps are advanced by the belts 57 and 58 toward the drive wheel 61, the flange 80 engages the innermost cap and pushes both caps outwardly a sufficient distance so that the outermost cap is no longer engaged by the belts 57 and 58. In addition, this outward movement enables the outermost cap to strike the deflector 109, and the cap drops downwardly from the belts 57 and 58 onto the transverse chute 108 and the return chute 107. The caps in the chute 107 are returned by gravity through the opening 107a in the guard 48 to the infeed wheel 40, and these caps are then oriented by the wheel 40 and are again deposited between the belts 57 and 58 in a manner similar to that described above.

In the illustrated embodiment of the invention, the deflector 109 is particularly advantageous in that it insures that the container caps 17 do not reach the disc 90 in a telescoped or nested condition. In other good arrangements, particularly where the caps being ordered are provided with an anti-nesting ring or like device, this deflector, together with its associated parts, may be omitted without departing from the spirit and scope of the invention.

The peripheral speed of the disc 90 (FIGURES 3 and 10) is such that the container caps 17 coming from the plate 81 are transferred to the guideway 97 at a predetermined rate, and any caps in excess of this rate are automatically returned to the hopper 18 without interruption of the ordering operation. Thus, should the caps 17 be deposited on the rotating disc 90 at a rate greater than the desired rate, the caps build up on the disc, as shown by dotted lines in FIGURE 10, and the excess caps pass between the extension 103 adjacent the right end of the guide rod 102 and the left end 106 of the guide rod 104. As a result of the centrifugal forces exerted on the excess caps by reason of the rotation of the disc 90, these caps slide off the rearwardly disposed portion of the disc 90 and are returned to the hopper 18. The remaining caps on the disc 90 are transferred to the guideway 97 at the desired rate in the manner described heretofore.

The ordering apparatus 15 is readily adjustable to accommodate container caps or other articles of widely varying dimensions. Thus, should it be desired to properly order container caps having a base diameter larger than that of the caps 17, for example, an adjusting screw 125 (FIGURE 7) on the outermost member 42 of the infeed wheel 40 is loosened, and the member 42 is moved outwardly along the shaft 41 to accommodate the larger sized caps. Additionally, the spacing between the belts 57 and 58 is widened by loosening the set screws 78 on the sheave portion 75 and the pusher wheel 79 to thereby adjust the position of these parts on the shaft 62. The idler sheaves 64 and 65 and the outer guide rail 59 are similarly adjusted to accommodate the increased belt spacing. In addition, to enable the apparatus 15 to order the larger sized caps, the brackets 82, 98 and 99 are adjusted to thereby increase the spacing between the guide rods on the plate 81 and the guideway 97.

In a similar manner, the ordering apparatus 15 may be adjusted to properly order container caps or other articles having a size smaller than the caps 17 shown in the drawings. As a result of the construction described above, the apparatus 15 may be adjusted to enable the ordering of articles of extremely wide dimensional variation.

As indicated heretofore, each of the caps 17 or other articles being ordered is firmly grasped during a major portion of the ordering operation by the belts 57 and 58. Largely as a result of this firm control, the ordering apparatus 15 may be operated at a relatively high rate of speed without damage to the caps or injury to the machine. As an illustration, in one satisfactory embodiment, the apparatus is operated at a speed such that properly ordered container caps are discharged from the guideway 97 at a uniform and predetermined rate of 400 caps per minute. Any caps deposited on the disc 90 in excess of this rate are automatically returned to the hopper 18 without interruption of the ordering operation. Of course, this figure is purely illustrative, and both higher and lower discharge rates may be employed without departing from the spirit and scope of the invention.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. An apparatus for ordering a plurality of articles and feeding the same along a path, comprising, in combination, a pair of spaced, juxtaposed belts including upper and lower reaches, said lower reaches extending along said path, infeed means adjacent one end of said lower reaches, feeding means for delivering a random supply of elongated articles to be ordered to said infeed means, each of said articles having an enlarged portion thereon, said infeed means being adapted to orient all of the articles delivered thereto with their longitudinal axes disposed in a uniform plane and to position the thus oriented articles between the lower reaches of said belts with their enlarged portions facing in a given direction, operating means for moving said belts, to thereby advance the articles therebetween along said path, and means adjacent the other end of said lower reaches for receiving said articles and removing the same from said belts, said last mentioned means being adapted to invert said articles so that their enlarged portions face in a direction opposite to said given direction.

2. An apparatus for ordering a plurality of articles and feeding the same along a path, comprising, in combination, a pair of spaced, juxtaposed belts including upper and lower reaches, said lower reaches extending along said path, infeed means adjacent one end of said lower reaches, metering means for delivering a random supply of articles to be ordered to said infeed means at a uniform rate, each of said articles having an enlarged portion thereon, said infeed means being adapted to arrange all of the articles delivered thereto in accordance with a selected orientation and to position the thus oriented articles between said lower reaches with their enlarged portions uppermost, means for moving said belts, to thereby advance the articles therebetween along said path, receiving means disposed along said path and adapted to receive said articles from said belts, and means responsive to an excess rate of articles received by said receiving means for returning the excess articles to said metering means.

3. An apparatus for ordering a plurality of articles and feeding the same along a path at a predetermined rate, said apparatus comprising, in combination, a pair of spaced, juxtaposed belts extending along said path, infeed means positioned along said path and including two rotatable members in spaced relationship with each other, feeding means for delivering a random supply of articles to be ordered to said infeed means and between said members, each of said articles having an enlarged portion thereon, means for operating said infeed means, to thereby rotate said members, said members being adapted upon rotation to arrange all of the articles delivered thereto in accordance with a selected orientation and to position the thus oriented articles between said belts with their enlarged portions facing in a given direction, means for moving said belts, to thereby advance the articles therebetween along said path, receiving means disposed along said path and adapted to receive said articles from said belts, and means responsive to the delivery of articles to said receiving means at a rate in excess of said predetermined rate for returning the excess articles to said feeding means.

4. An apparatus for ordering a plurality of articles and feeding the same along a path at a predetermined rate, said apparatus comprising, in combination, a pair of elongated belts extending along said path in spaced, substantially parallel relationship with each other, infeed means positioned along said path and including two rotatable annular members spaced apart on an axis transverse to said path, feeding means for delivering a random supply of articles to be ordered to said infeed means and between said members, each of said articles having an enlarged portion thereon, means for operating said infeed means, to thereby rotate said annular members, said members being adapted upon rotation to arrange all of the articles delivered thereto in accordance with a selected orientation and to position the thus oriented articles between said belts with their enlarged portions facing in a given direction, means for moving said belts, to thereby advance the articles therebetween along said path, receiving means disposed along said path and adapted to receive said articles from said belts, and means responsive to the delivery of articles to said receiving means at a rate in excess of said predetermined rate for returning the excess articles to said feeding means.

5. In an apparatus for ordering a plurality of articles, in combination, a pair of elongated belts positioned in spaced, substantially parallel relationship with each other, orienting means disposed adjacent said belts and including two rotatable members spaced apart on an axis transverse to said belts, means for delivering a random supply of articles to be ordered to said orienting means, each of said articles having an enlarged portion thereon, the spacing between said rotatable members being sufficient to enable said articles to pass therebetween, and means for operating said orienting means, to thereby rotate said members, said members being adapted upon rotation to arrange all of the articles therebetween in accordance with a selected orientation and to position the thus oriented articles between said belts with their enlarged portions facing in a given direction.

6. In an apparatus for ordering a plurality of articles, in combination, a pair of elongated belts positioned in spaced, parallel relationship with each other, orienting means disposed adjacent said belts and including two rotatable members of substantially conical configuration spaced apart on an axis transverse to said belts, the base portions of said rotatable members facing each other and defining an infeed opening therebetween, means for delivering a random supply of elongated articles to be ordered to said infeed opening, each of said articles having an enlarged portion thereon, and means for operating said orienting means, to thereby rotate said members, said members being adapted upon rotation to orient all of the articles in said infeed opening with their longitudinal axes disposed in a uniform plane and to position the thus oriented articles between said belts with their enlarged portions facing in a given direction.

7. In an apparatus for ordering a plurality of articles, in combination, a pair of spaced, juxtaposed belts extending in a substantially horizontal direction, orienting means positioned above said belts and including two annular members of conical configuration rotatably disposed on a horizontal axis transverse to said belts, the base portions of said members facing each other and being spaced apart by a distance greater than that between said belts, to thereby form an infeed opening therebetween, means for delivering a random supply of elongated articles to be ordered to said infeed opening, each of said articles having an enlarged portion thereon, and means for operating said orienting means, to thereby rotate said members, said members being adapted upon rotation to orient all of the articles in said infeed opening with their longitudinal axes disposed in a vertical plane, the thus oriented articles dropping from said infeed opening to a position between said belts with their enlarged portions uppermost.

8. In an apparatus for ordering a plurality of articles, in combination, a pair of elongated belts extending along a feed path in spaced, parallel relationship with each other, orienting means disposed adjacent said belts and including two annular members of substantially conical configuration rotatably positioned on an axis transverse to said belts, the base portions of said annular members facing each other and being spaced apart by a distance greater than that between said belts, to thereby form an infeed opening therebetween, means for delivering a random supply of articles to be ordered to said delivery opening, each of said articles having an enlarged portion thereon, means for operating said orienting means, to thereby rotate said members, said members being adapted upon rotation to arrange all of the articles in said delivery opening in accordance with a selected orientation and to position the thus oriented articles between said belts with their enlarged portions facing in a given direction, and means for moving said belts, to thereby advance the articles therebetween along said feed path.

9. An apparatus for ordering tapered articles and feeding the same along a path at a predetermined rate, said apparatus comprising, in combination, a pair of elongated belts extending along said path in spaced, parallel relationship with each other, orienting means adjacent one end of said path and including two rotatable members spaced apart on an axis transverse to said path, feeding means for delivering a random supply of tapered articles to be ordered to said orienting means, the spacing between said rotatable members being sufficient to enable said articles to pass therebetween, means for operating said orienting means, to thereby rotate said members, said members being adapted upon rotation to orient the articles delivered thereto with their longitudinal axes disposed in a uniform plane and to position the thus oriented articles between said belts, means for moving said belts, to thereby advance the articles therebetween along said path, receiving means disposed along said path and adapted to receive said articles from said belts, first return means positioned along said path between said orienting means and said receiving means for returning articles improperly positioned between said belts to said feeding means, and second return means responsive to the delivery of articles to said receiving means at a rate in excess of said predetermined rate for returning the excess articles to said feeding means.

10. An apparatus for ordering tapered articles and feeding the same along a path at a predetermined rate, said apparatus comprising, in combination, a pair of elongated belts extending along said path in spaced, parallel relationship with each other, orienting means positioned along said path and including two annular members of substantially conical configuration rotatably disposed on an axis transverse to said path, feeding means for delivering a random supply of tapered articles to be ordered to said orienting means, the base portions of said annular members facing each other and being spaced apart by a distance sufficient to enable said articles to pass therebetween, means for operating said orienting means, to thereby rotate said members, said members being adapted upon rotation to orient all of the articles delivered thereto with their longitudinal axes disposed in a uniform plane and to position the thus oriented articles between said belts with their enlarged portions uppermost, means for moving said belts, to thereby advance the articles therebetween along said path, receiving means disposed along said path and adapted to receive said articles from said belts and to invert said articles so that their enlarged portions face downwardly, first return means positioned along said path between said orienting means and said receiving means for returning articles nested between said belts to said feeding means, and second return means responsive to the delivery of articles to said receiving means at a rate in excess of said predetermined rate for returning the excess articles to said feeding means.

11. An apparatus for ordering tapered articles and feeding the same along a path at a predetermined rate, said apparatus comprising, in combination, a pair of spaced, juxtaposed belts including upper and lower reaches, said lower reaches extending along said path, orienting means positioned adjacent one end of said lower reaches and including two annular members of substantially conical configuration rotatably disposed on an axis transverse to said path, feeding means for delivering a random supply of tapered articles to be ordered to said orienting means, the base portions of said annular members facing each other and being spaced apart by a distance sufficient to enable said articles to pass therebetween, first actuating means for operating said orienting means, to thereby rotate said members, said members being adapted upon rotation to orient all of the articles delivered thereto with their longitudinal axes disposed in a uniform, vertical plane and to position the thus oriented articles between the lower reaches of said belts with their enlarged portions uppermost, second actuating means for moving said belts, to thereby advance the articles therebetween along said path, receiving means disposed along said path and adapted to receive said articles from said belts and to invert said articles so that their enlarged portions face downwardly, first return means positioned along said path between said orienting means and said receiving means for returning articles nested between said belts to said feeding means, and second return means responsive to the delivery of articles to said receiving means at a rate in excess of said predetermined rate for automatically returning the excess articles to said feeding means without interruption of said first and said second actuating means.

12. In an apparatus for ordering a plurality of articles and feeding the same along a path, in combination, orienting means positioned adjacent said path and including two annular members of substantially conical configuration rotatably positioned on an axis transverse to said path, the base portions of said annular members facing each other and being spaced apart to form an opening therebetween, means for delivering a random supply of elongated articles to be ordered to said opening receiving means disposed along said path adjacent said opening for receiving said articles therefrom, and means for operating said orienting means, to thereby rotate said members, said members being adapted upon rotation to orient all of the articles delivered to said opening with their longitudinal axes disposed in a uniform plane and to position the thus oriented articles on said receiving means.

13. An apparatus for ordering a plurality of articles and feeding the same along a path at a predetermined rate, said apparatus comprising, in combination, a pair of elongated belts extending along said path in spaced, substantially parallel relationship with each other, an infeed hopper positioned adjacent one end of said path and having a delivery opening therein, said hopper including a random supply of articles to be ordered, each of said articles having an enlarged portion thereon, orienting means for receiving said articles from said delivery opening and positioning said articles between said belts with their enlarged portions facing in a given direction, means for moving said belts, to thereby advance the articles therebetween along said path, receiving means disposed along said path and adapted to receive the oriented articles from said belts, and return means responsive to the delivery of oriented articles to said receiving means at a rate in excess of said predetermined rate for returning the excess articles to said hopper, said return means including a horizontally rotatable disc to which all of said oriented articles are delivered, a part of the periphery of said disc being positioned above said hopper, means for rotating said disc and means for deflecting the excess articles on said disc toward said disc part, said excess articles being returned to said hopper as said disc rotates.

References Cited in the file of this patent
UNITED STATES PATENTS

| | | |
|---|---|---|
| 2,252,498 | Flaws | Aug. 12, 1941 |
| 2,383,528 | Winters | Aug. 28, 1945 |
| 2,585,558 | Lakso | Feb. 12, 1952 |
| 2,649,214 | Kirby | Aug. 18, 1953 |
| 2,764,274 | Griswold | Sept. 25, 1956 |
| 2,787,362 | Hill | Apr. 2, 1957 |
| 2,911,088 | Ingham | Nov. 3, 1959 |